UNITED STATES PATENT OFFICE.

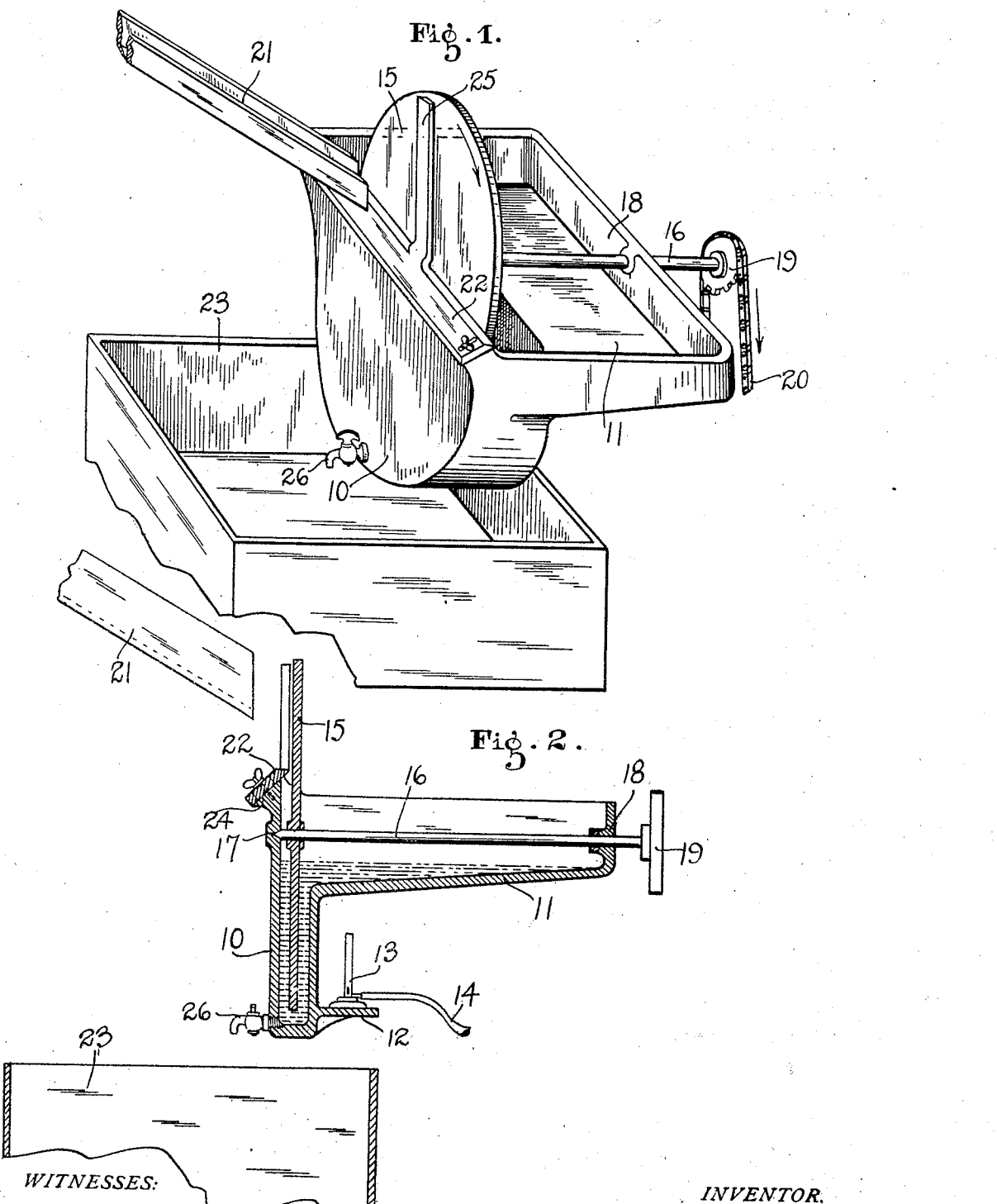

DANIEL H. TALBERT, OF INDIANAPOLIS, INDIANA.

MACHINE FOR APPLYING FLUID TO OBJECTS.

1,109,087.   Specification of Letters Patent.   Patented Sept. 1, 1914.

Application filed July 8, 1912. Serial No. 708,200.

*To all whom it may concern:*

Be it known that I, DANIEL H. TALBERT, a citizen of the United States, and a resident of Indianapolis, county of Marion, and State of Indiana, have invented a certain useful Machine for Applying Fluid to Objects; and I do hereby declare that the following is a full, clear, and exact description thereof, reference being had to the accompanying drawings.

The object of this invention is to provide an improved device for buttering popcorn and the like, although it may be used for other kindred purposes.

It is intended preferably for a continuously operating popcorn and buttering machine, and to that end it is arranged so as to apply butter properly to a continuous flow of popcorn, and also so to treat the popcorn as not to apply too much butter to it, and what is of more importance, to treat the popcorn with butter uniformly and thus avoid the objections to the buttering of the popcorn where the same is buttered by pouring the butter over the popcorn or mixing the popcorn with the butter. Also the amount of butter may be determined by changing the speed of the buttering disk or the degree of heat to vary the thickness of the butter and thus vary the amount which would be taken up by the buttering disk.

The nature of the invention will be understood from the accompanying drawings and the following description and claims:

In the drawings, Figure 1 is a perspective view of the device with a portion of the popcorn chute and box broken away. Fig. 2 is a vertical section through the device, the lower part of the popcorn box being broken away.

The buttering portion of the device has a casing provided with a semi-cylindrical vertically disposed buttering chamber 10 in one side of the casing and a portion 11 extending laterally from the upper part thereof with its bottom sloping slightly to the buttering chamber. The butter normally fills the chamber 10 and extends somewhat above the sloping bottom 11. From the lower portion of the chamber 10 a bracket 12 extends on which a heater 13 is located supplied with gas through a tube 14. This heater is located beneath the sloping bottom 11, but close to the semi-cylindrical butter heater 10 so as to heat the butter in both portions of the device.

The butter is carried up from the butter chamber by a vertical disk 15, the lower portion of which operates in the chamber 10 and it is rotated by a shaft 16 having a bearing at 17 in one side wall of the casing and a bearing at 18 in the other side wall thereof and it is driven by a sprocket 19 and a sprocket chain 20 in the direction indicated by the arrow. As the butter disk 15 rotates, a thin film of butter adheres to the side thereof and the popcorn is buttered by rolling in against the side of the disk from a chute 21 which leads from the popper or other pop corn supplying means. Hence, only a small amount of butter adheres to the popcorn, for the latter merely rolls against the disk 15 and bounces immediately therefrom down on an inclined plate 22 and falls into the popcorn box 23 located below the buttering device. The plate 22 is mounted on an inclined rib 24 at the upper edge of one wall of the chamber 10 and said plate 22 is inclined upwardly toward the disk 15 and preferably has a sharp or beveled edge coming very close to said disk 15, but not touching it so as to leave enough space between for the passage of a thin film of butter and yet close enough to prevent popcorn or other material coming through the device with the popcorn from entering the buttering chamber. Whatever portion of the popcorn may adhere to the side of the disk 15 will be pushed up or dislodged by a bar 25 which extends up from the middle portion of the plate 22 and radially of the disk 15 and extends close to the same, but out of contact therewith so as not to scrape off the butter, but to push off all other things and cause them to fall down into the popcorn box. The butter chamber is provided with a waste cock 26 to remove any water which may accumulate therein or to remove the butter if desired. For that purpose a cup or vessel is held under the cock 26.

It is desired that the popcorn be discharged against an upwardly moving portion of the side of the buttering plate so that the movement of that portion of the plate will be vertical and in an opposite direction to the downward movement of the popcorn for the better buttering of the popcorn, and also for facilitating the dislodgment of the popcorn because gravity can act upon the popcorn in a direction opposite to the movement of that portion of the disk. The quantity of butter applied to the popcorn can be controlled and determined by either changing the speed of the buttering disk or the temperature of the butter. If the disk operates very rapidly it will take up a thinner film of butter and if the heat of the butter is increased, the disk will likewise take up a thinner film of butter. In either or both of these ways, the quantity of butter applied to the popcorn can be readily controlled.

I claim as my invention:

1. A machine for applying fluid to objects including a chamber adapted to contain the fluid, a vertical rotatable disk with the lower portion thereof projecting into the fluid chamber, and means for discharging the objects to be treated against the upwardly moving side face vertical surface of the disk.

2. A machine for applying fluid to objects including a chamber adapted to contain the fluid, a vertical rotatable disk with the lower portion thereof projecting into the fluid chamber, and a chute inclined downwardly and adapted to discharge the objects to be treated against the upwardly moving side face of said disk.

3. A machine for applying fluid to objects including a fluid chamber, a vertically rotatable disk and with the lower portion projecting into said chamber, a plate connected with said chamber and projecting into close proximity with the side face of said disk, and means for discharging the objects to be treated against an upwardly moving side face of said disk and above said plate whereby the objects will be prevented from entering the fluid chamber and will fall by gravity outside the same.

4. A machine for applying fluid to objects including a fluid chamber, a fluid elevating body vertically rotated and with the lower portion projecting into said chamber, a plate connected with said chamber and projecting into close proximity with the surface of said fluid elevating body, means for discharging the objects to be treated against an upwardly moving portion of the surface of said fluid elevating body and above said plate, and a bar extending upwardly from said plate and close to said fluid elevating body to dislodge any object adhering to the surface of said fluid elevating body.

5. A machine for applying fluid to objects including a fluid chamber, a fluid elevating body vertically rotated and with the lower portion projecting into said chamber, a plate connected with said chamber and projecting into close proximity with the surface of said fluid elevating body, means for discharging the objects to be treated against an upwardly moving portion of the surface of said fluid elevating body and above said plate, a bar extending upwardly from said plate and close to said fluid elevating body to dislodge any object adhering to the surface of said fluid elevating body, and means for adjusting the position of said plate and bar with relation to said fluid elevating body.

6. A machine for applying fluid to objects including a fluid chamber having at one side a deep portion and at the other side a shallow portion with the bottom thereof sloping downwardly to the deep portion, means for heating the fluid, a vertical disk with the lower portion extending into the deep portion of said chamber, means for locating the disk, and a chute for discharging the objects to be treated against the upwardly moving side face of the disk above the fluid chamber.

7. A machine for applying fluid to objects including a fluid chamber having at one side a deep portion and at the other side a shallow portion with the bottom thereof sloping downwardly to the deep portion, means for heating the fluid, a vertical disk with the lower portion extending into the deep portion of said chamber, means for locating the disk, a chute for discharging the objects to be treated against the upwardly moving side face of the disk above the fluid chamber, and a box located below said fluid chamber for receiving the objects after being treated as they fall by gravity.

In witness whereof, I have hereunto affixed my signature in the presence of the witnesses herein named.

DANIEL H. TALBERT.

Witnesses:
O. M. McLaughlin,
E. H. Mayo.